United States Patent
Peterson et al.

(10) Patent No.: US 6,577,713 B1
(45) Date of Patent: Jun. 10, 2003

(54) METHOD OF CREATING A TELEPHONE DATA CAPTURING SYSTEM

(75) Inventors: Curtis M. Peterson, Centerville, UT (US); Richard G. Mann, Centerville, UT (US)

(73) Assignee: iQuest Technologies, Inc., Draper, UT (US)

( * ) Notice: Subject to any disclaimer, the term of this patent is extended or adjusted under 35 U.S.C. 154(b) by 0 days.

(21) Appl. No.: 09/415,133

(22) Filed: Oct. 8, 1999

(51) Int. Cl.[7] .................................................. H04M 1/65
(52) U.S. Cl. ................................ 379/88.22; 379/88.17; 379/201.03
(58) Field of Search .................. 705/10, 14; 379/88.17, 379/67.01, 88.11, 76, 88.16, 88.22, 88.23, 201.01, 201.03

(56) References Cited

U.S. PATENT DOCUMENTS

| | | | |
|---|---|---|---|
| 4,320,256 A | | 3/1982 | Freeman |
| 4,355,372 A | | 10/1982 | Johnson et al. |
| 4,603,232 A | | 7/1986 | Kurland et al. |
| 4,785,408 A | * | 11/1988 | Britton et al. ......... 379/201.03 |
| 5,099,422 A | | 3/1992 | Foresman et al. |
| 5,452,341 A | * | 9/1995 | Sattar .......................... 379/88 |
| 5,737,393 A | * | 4/1998 | Wolf ....................... 379/88.13 |
| 5,771,276 A | * | 6/1998 | Wolf ........................... 379/88 |
| 5,835,565 A | * | 11/1998 | Smith et al. ................. 375/224 |
| 5,838,774 A | | 11/1998 | Weisser, Jr. |
| 5,878,423 A | * | 3/1999 | Anderson et al. ........... 707/100 |
| 5,893,075 A | | 4/1999 | Plainfield et al. |
| 5,893,098 A | | 4/1999 | Peters et al. |
| 5,945,989 A | * | 8/1999 | Freishtat et al. ............. 345/329 |
| 6,058,166 A | * | 5/2000 | Osder et al. ............. 379/88.22 |
| 6,101,241 A | * | 8/2000 | Boyce et al. ............ 379/88.01 |
| 6,243,451 B1 | * | 6/2001 | Shah et al. .................. 370/352 |
| 6,256,614 B1 | * | 7/2001 | Wecker et al. ................. 705/14 |
| 6,296,336 B1 | * | 7/2001 | Ladd et al. .................. 704/270 |
| 6,317,492 B1 | * | 11/2001 | Johnson .................. 379/201.03 |

* cited by examiner

Primary Examiner—Scott L. Weaver
(74) Attorney, Agent, or Firm—Thorpe North & Western L.L.P.

(57) ABSTRACT

A customer survey design system that allows survey organizations to easily design and modify the survey, and to do so in a shorter period of time. In particular, there is a telephone survey creation method usable by a non-technical person, using a single web site and an audio responsive system like a telephone. The client is allowed to create a customer survey to be taken over a phone. Specifically, there is a step of accessing a web site and begin creating the survey by typing in survey questions and enteries. Additionally, there is a second step of completing the creation of the survey by providing a voice script for each question typed onto the web site. Creating the survey also includes the step of allowing the client to modify the questions created on the web site. Additionally, there is a method of accessing a web site that further comprises the steps of a) selecting an entry from a pre-set entry list for the survey, b) determining if the selected entry is a question, and if so, prompting the client to type the question to be asked in the survey, and thereafter completing the question criteria, and returning to the step of selecting a pre-set entry.

14 Claims, 5 Drawing Sheets

METHOD OF CREATING A TELEPHONE DATA CAPTURING SYSTEM

BACKGROUND OF THE INVENTION

1. Field of the Invention

This invention relates to a telephone survey creation method. In particular, there is a method of creating a telephone survey, by a non-technical person, using a single web site and an audio responsive system like a telephone.

2. Description of the Related Art

The background art shows a variety of methods for creating and designing telephone surveys. For example, market survey data collection systems are well known in the art. One of the more common prior art systems for collecting such data involves the use of survey booklets or questionnaires that are disseminated by mail to a diverse group of panelists. The survey is individually hand written into by the panelists to record the survey data relating to their particular shopping habits for various identified products. Thereby, it is mailed back to the survey company by the panelist where the data is then key punched and ultimately read into a data processor or computer for accumulative processing of all of this data. This procedure, although satisfactory under some circumstances, is time consuming, costly and provides many opportunities for erroneous data entry due to carelessness either by the panelist who is writing in the data by hand or by the keypunch operator who is subsequently encoding the hand written data.

Various business, governmental, and media-based organizations often find it desirable to obtain reliable and timely data representative of opinion in regard to some question of local, regional, or national interest. Typically, the question of interest is broadcast via the transmitter of a television or radio station and individuals in the station audience are invited to express their opinion in regard to the matter by the use of their telephone sets. Telephone-based audience survey systems are called upon to handle a high caller volume at a relatively low cost in a manner that insures wide audience acceptability and that provides highly reliable data.

Presently available telephone-based audience survey systems are expensive and labor intensive. Where the survey is conducted manually by operators or the like, it is not only costly but slow. Where such surveys have been conducted by the telephone company, two separate telephone numbers are required for the participant and the information as to the results must be obtained from an office of the telephone company.

Newer computer-based systems have been developed because of the high costs in soliciting questions. For example, touch-tone phone systems are well known and extend throughout the world. Such systems have been used for normal telephone conversations and as datasets but have only recently achieved their full utilization as a communications interface. Specifically, recent systems act as verbally interactive telephone interrogation systems using a conventional two-way telephone subscriber network to enable individual subscriber selection of telephone messages with which the subscriber may individually interact and to which the subscriber may respond and have the response recorded or accumulated in an automatic telephone survey. This system has become popular for purposes of polling or interrogation, such as the cable TV system known as QUBE.

Examples of patents related to the present invention are as follows, and each patent is herein incorporated by reference for the supporting teachings:

U.S. Pat. No. 4,320,256, is an improved verbally interactive telephone interrogation system. It provides a two-way telephone subscriber network, such as a touch-tone type two-way telephone subscriber network, is used to enable both telephone call placement and individualized remote variable audio message selection and interrogation of pre-recorded audio messages as well as remote response accumulation. The touch-tone type telephone, which is employed to maintain normal telephone contact with other subscribers, is also utilized to call-up a multi track magnetic storage device that provides selectable reproducible conversational responsive audio messages to particular conversational responsive audio messages to particular primary reproducible interrogatory message from a plurality of different selectable audio messages stored thereon.

U.S. Pat. No. 4,355,372 is a method for independently electronically collecting related market survey data from a plurality of diverse locations (6,6') for temporary storage 20 at each of the independent diverse locations (6,6') where the data is collected for subsequent transmission thereof from these locations (6,6') over a telephone type link (30,36,42) for accumulative processing thereof at a remote central electronic data processor. An interactive interchangeable prompt message display is displayed on a visual display device (32) indicating one of a plurality of market survey categories in a predefined sequence. An actual data input signal may be provided via a keyboard (70) or barboard (29) and/or wand (18,28) in response to the prompt message display with this input being stored in a memory (16) for subsequent transmission. Prior to storage in the memory (16), the data is stored in a buffer and is displayed on the display device (32) to enable confirmation prior to transfer to the bulk memory (16). When a confirmation command signal is provided to the microcomputer (10,12,14) the data is transferred to the bulk memory (16) and the display (32) is changed to display the next prompt message in the sequence. The sequence recycles for each market transaction for enabling independent integral storage (16) of each product transaction at the location of the unit (6,6'). This stored data is then transmitted to the remote data processor via acoustic coupling (30,36,42) to the telephone line.

U.S. Pat. No. 4,451,700 is a telephone based automatic audience survey system for polling an audience to obtain data representative of the opinion regarding a question of interest is disclosed having a first means responsive to incoming calls for answering the calls with an analog voice signal that both identifies the telephone based automatic audience survey system and queries a response in regard to the question of interest, and a second means connected to the first means and responsive to the answers provided to the query portions of the analog voice signal for providing data representative of the consensus regarding the question of interest. Third means connected to the second means are operative to display the data in real-time. The third means includes a video character generator, an audio signal generator, and an operator display.

U.S. Pat. No. 4,603,232 is a method for independently centrally electronically accumulating market survey data from different content rapidly disseminated multiple inquiry market surveys from a plurality of panelist stations (14,16, 18,20) located at diverse locations. Variable market survey questionnaires to diverse located panelists may be as remotely rapidly disseminated from a centrally located host computer (12) to the panelist stations (14,16,18,20) over a common communications link (22 or 104) for individual visual display at the panelist stations (14,16,18,20), such as on a CRT (42) or television set (44) or alphanumeric display (45), with the displayed questionnaires resulting from a downstream loaded set of control instructions stored in a local survey program RAM (54) whose content may be remotely varied from the head end or host computer (12). The individualized responses provided by the panelists are locally processed (34,50) temporarily stored in a local survey data RAM (52) and subsequently transmitted back to the host computer (12) via a telephone type link (22) where they are accumulatively processed in a rapid fashion. Multiple different surveys can be downstream loaded to individual panelists, or to a subgroup of panelists, or to all panelists, and follow up surveys and/or tailored surveys can also be rapidly conducted, all under the control of the host computer (12) at the head end providing a rapid and flexible survey collection and dissemination method.

U.S. Pat. No. 5,099,422, the compiling system and method of the present invention enables the recording of individually customized information onto blank storage media devices, and includes a data base memory device for storing information signals indicative of customized recipient information pertaining to a group of recipients. A presentation memory device stores a group of pre-recorded signals indicative of a group of information segments to be compiled selectively. A computing device responds to stored information signals indicative of customized recipient information for selecting certain ones of said pre-recorded signals indicative of certain ones of said segments and for causing signals indicative of certain ones of said segments to be retrieved selectively in a given sequence for compilation purposes. A recording device responds to retrieved signals indicative of certain ones of said segments for storing said retrieved signals onto individual ones of the storage media devices.

U.S. Pat. No. 5,838,774, in an intelligent switched telephone network, a telephone polling method is provided wherein a call made in response to a telephone based polling service is processed and disconnected without connection of the call to the subscriber of the polling service. A call received in the network and directed to a number associated with a telephone polling service has its identification information read and compared to entries in a database of subscriber information for a matching entry. The call is tabulated in the database as a response to the polling service poll or survey. If desired by the polling service subscriber, the calling party may be provided with a caller interaction program through which the calling party may select from a variety of responses. If desired, the calling party may be provided with a call termination announcement.

U.S. Pat. No. 5,893,075 is an interactive, customer-accessible data processing system embodied in a programmed personal computer that induces customers of a restaurant, store or other business to enter information about themselves into the system. The information, which may include names, addresses, dates and answers to survey questions, is entered into data fields displayed on a display screen. The system enables a business to generate promotional messages tailored to customers based on the customer-entered information. For example, a business can readily generate birthday offer letters to customers based on their name, address, and birth date simply be selecting an option provided by the system. To induce customers to enter the necessary information, the system flashes an incentive message on the computer display screen. The message may offer to enter a customer into a drawing or other contest in return for the customer entering the necessary information into the system.

U.S. Pat. No. 5,893,098 is a system for obtaining information from a plurality of computer users (7 to 12), comprising a processing apparatus (2) including an input mechanism (3 and 4) via which a survey author may input data, and a survey authoring mechanism (FIG. 2) enabling construction of a survey questionnaire document including at least one question formulated from data input by the survey author, transmission mechanism (6) for transmitting the survey questionnaire document to a plurality of respondent users (7 to 12); and a processing apparatus (2) including a collating mechanism arranged to receive transmissions from the transmission mechanism, to identify response documents which include responses to the at least one question from the plurality of respondent users and to load a database in accordance with the responses.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicant's claimed invention.

3. Problems with the Prior Art

As is illustrated by the prior art, the use of telephone solicitation and survey taking is well known in the industry. The problem with all the prior art systems is that there are major limitations that inhibit the ability of the survey organization to create the survey in an easy, inexpensive and timely manner. Typically, the survey organization designs the set of survey questions. To use the modern telephone survey systems, the survey questions are provided to a group of highly skilled computer programmers who design the telephone survey system over a period of several weeks or months. Additionally, even after the customer survey has been programmed and is ready to be initiated, there is no easy and short method of modifying the survey short of reprogramming large portions of the created survey, which would add several days or weeks to the already large delay.

Therefore, there is a need for a customer survey design system that allows survey organizations to easily design the survey, modify the survey and to do so in a shorter period of time.

SUMMARY OF THE INVENTION

It is a feature of the invention to provide a customer survey design system that allows survey organizations to easily design and modify the survey, and to do so in a shorter period of time.

A further feature of the invention is to provide a method of creating a telephone survey, by a non-technical person, using a single web site and an audio responsive system, like a telephone.

An additional feature of the invention is to provide a method of allowing a client to create a customer survey to be taken over a phone. Specifically, there is a step of accessing a web site and begin creating the survey by typing in survey questions and enteries. Additionally, there is a second step of completing the creation of the survey by providing a voice script for each question typed onto the web site.

A further feature of the invention is to provide the method of creating the survey includes the step of allowing the client to modify the questions created on the web site. Additionally, there is a method of accessing a web site that further comprises the steps of a) selecting an entry from a pre-set entry list for the survey, b) determining if the selected entry is a question, and if so, prompting the client to type the question to be asked in the survey, and thereafter completing the question criteria, and returning to the step of selecting a pre-set entry.

A further feature of the invention is to provide the step of accessing a web site further comprising the steps of a) selecting an entry from a pre-set entry list for the survey, b) determining if the selected entry is an opening statement and, if so, prompting the client for completing the opening statement entry criteria, and c) returning to the step of selecting a pre-set entry.

Yet, an additional feature is to provide the step of accessing a web site further comprising the steps of: a) selecting an entry from a pre-set entry list for the survey; b) determining if the selected entry is a closing statement, and if so, prompting the client to complete closing statement criteria; and c) returning to the step of selecting a pre-set entry.

A further feature includes providing the step of accessing a web site further comprising the steps of determining if the enteries are acceptable to the client, and if not, returning the client to the step of selecting a pre-set entry or previously created entry, and if acceptable, providing the client with a unique identifyer number.

Again, a feature of the invention is to include the step of completing the creation of the survey by providing a voice script for each question typed onto the web site, further comprising the steps of: a) entering the unique identifyer number over the telephone to access the survey; and b) speaking a voice script for the opening statement, if there was an opening statement created over the web site.

Moreover, there are additionally provided the step of completing the creation of the survey by providing a voice script for each question typed onto the web site, further comprising the steps of: a) reading the voice scripts, over the telephone, created for each question typed onto the web site; and b) speaking a voice script for the closing statement, if there was a closing statement created over the web site.

Additionally, the invention provides the step of completing the creation of the survey by providing a voice script for each question typed onto the web site, further comprising the steps of: a) determining if the voice scripts are completed to the satisfaction of the client; and b) providing the client with a unique customer phone number to be accesses by the customer to take the survey over the telephone.

The invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter which would form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims are regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, neither is it intended to be limiting as to the scope of the invention in any way.

Other features of the present invention will become clearer from the following detailed description of the invention, taken with the accompanying drawings and claims, or may be learned by the practice of the invention.

It is noted that the drawings of the invention are not to scale. The drawings are merely schematic representations, not intended to portray specific parameters of the invention. The drawings are intended to depict only typical embodiments of the invention, it and therefore should not be considered as limiting the scope of the invention. The invention will be described with additional specificity and detail through the use of the accompanying drawings. Like numbering between figures represents like elements.

DETAILED DESCRIPTION OF THE PREFERRED EMBODIMENT

Figure 1:
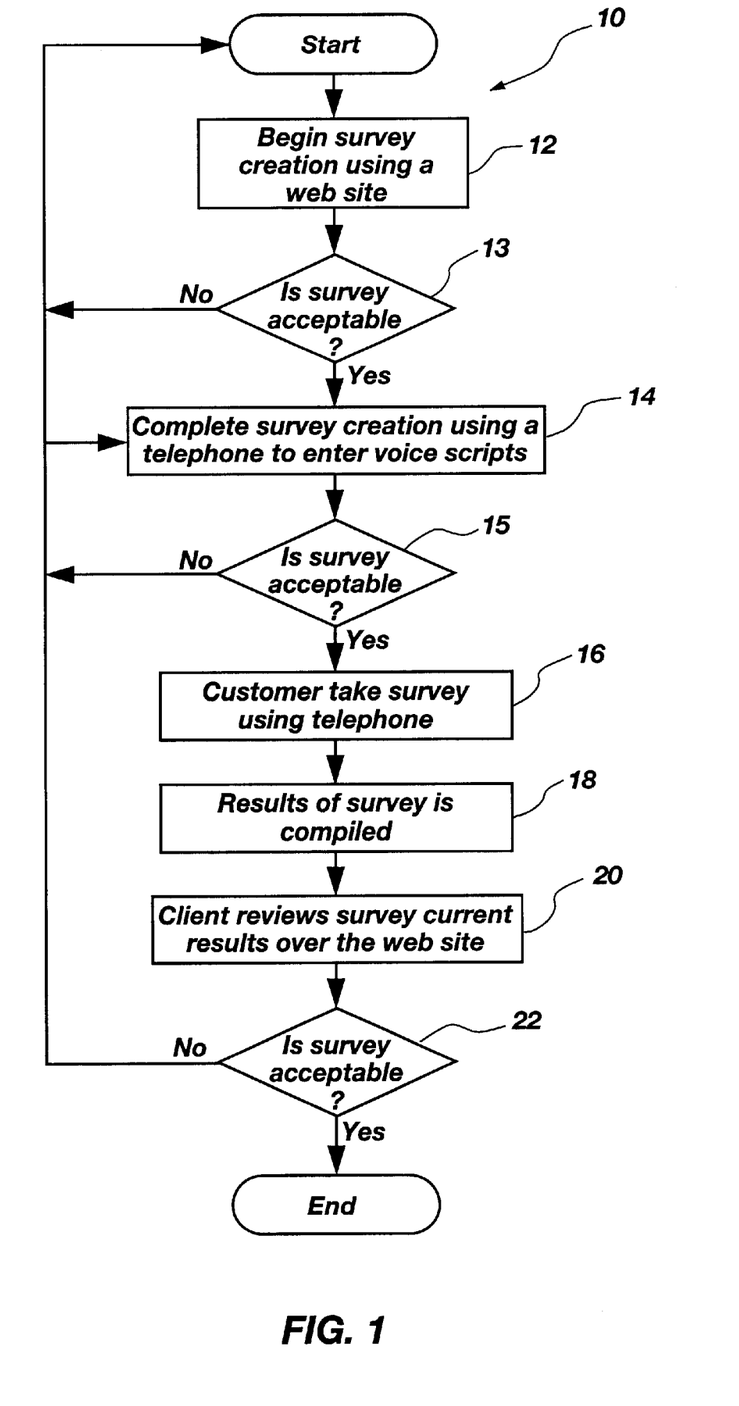
FIG. 1 is a schematic flow chart of the overall process of designing the telephone-based customer survey system.

Referring to FIG. 1, there is a schematic flow chart of the overall process 10 of designing the telephone-based customer survey system and using the system by a customer and client. Specifically, there is a first step of beginning the survey creation 12 where a client begins the creation by using a web site and entering information through a computer keyboard and graphical interface. A second step 13 of the system allows the client to change the survey that has thus far been created. A next step 14 allows the client to complete the survey using a telephone to enter voice scripts of the questions that were entered into the survey during the first step 12 over the web site. In another step 15, the client can review the survey and determine if the survey is in a final form, and if it is not, the client can return to start and modify any portion of or all of the survey. After completion of the survey to the clients satisfaction, in step 16, a customer is provided with a telephone number to take the survey. Specifically, the customer listens to the automated survey questions over a phone and presses the phone key pads or speaks a response to answer the questions. Another step 18 occurs when survey results are compiled via a computer system. Thereafter, in step 20, the client can access the survey results on the web site used in step 12. Finally, in a seventh step 22, the client can decide if the survey should be modified again or to continue with the same survey. If he wishes to modify the survey, he returns to the first step and can modify portions of or all of the survey.

Figure 2:
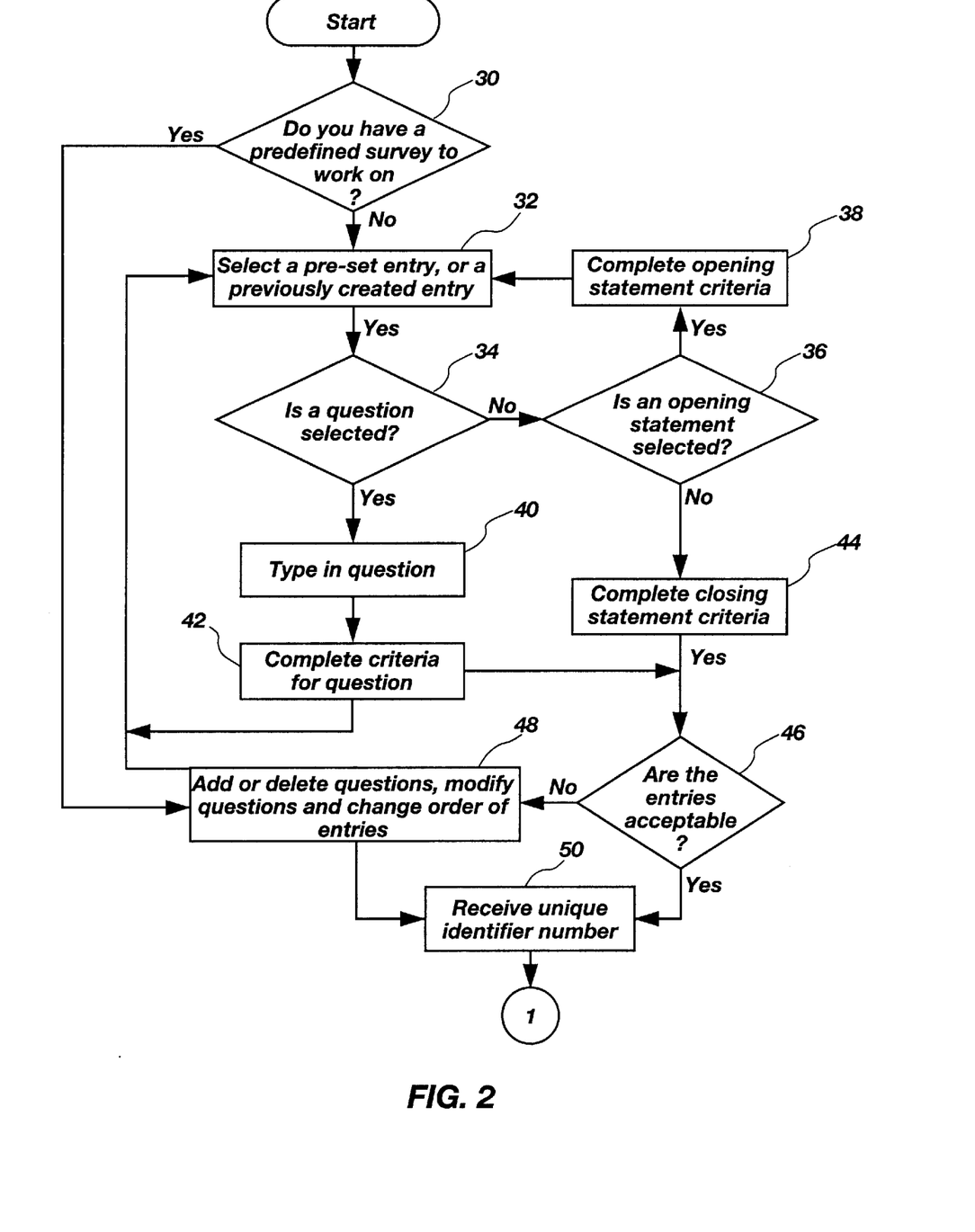
FIG. 2 is a detailed schematic flow chart of a first portion of FIG. 1.

Referring to FIG. 2, there is a detailed schematic flow chart of a first portion of FIG. 1. A first step 30 occurs when the client logs onto the survey creation web site and answers if they have a pre-defined, previously saved or a template of a survey to work on. If this is a new survey to be created, then the client, in step 32, begins developing their survey by selecting pre-set entries or questions, which will be described hereinafter. Specifically, in step 34, the client is prompted to select the type of entry or question that is to be next in the survey. For example, typical questions include multiple choice, true and false, yes or no, and even open ended questions requiring a verbal response that will be recorded. If a question is selected to be created, in step 40, the client types text into a dialog box, like: "Are you a current subscriber to our magazine?". Next, in step 42, the criteria for that question is completed, like selecting a "one on the phone key pad for yes or select two for no" to answer the question. Another way to answer the question could be to use a multiple choice, like press one on the phone if you are not a current subscriber, press two if you have been a subscriber for less then two years, press three if you have been a subscriber for less then five years, and so on. This is followed up by returning the client to the main selection menu step 32. Additionally, typical surveys will include an opening statement that is used to greet the survey customer and to explain the purpose of the survey. When the opening statement is selected, step 34 identifies this as not being a question and step 36 identifies this as an opening statement, where step 38 then completes the greeting criteria and returns the client to the selection menu 32. Additionally, surveys typically include a closing statement. When the closing statement is selected, which is designed to be the last step of the survey creation system, then steps 34 and 36 will route to step 44, where closing statement criteria is completed.

After all of the opening and closing statements and the questions have been entered into the survey, there is a process provided for, in steps 46 and 48, changing the questions and enteries, changing the order of the enteries or questions, and/or adding or deleting questions or enteries. This allows the client the option of modifying specific wording, like, for example, changing: "Are you a current subscriber to our magazine?" to the following question "Are you a current subscriber to the Mighty Mights Magazine?". Additionally, this step also allows you, for example, to move question number thirty to question number twenty. Also, it is possible to change questions, for example, you could change "Are you a current subscriber to our magazine?", to a multiple choice question, like: "How long have you been a subscriber to our magazine?". It is even possible to delete questions.

Another feature of this invention is to allow clients who have already created a survey to enter the same survey again, in step 30, and modify it, in step 48, even if the survey is currently being used. This is done by accessing the web site and giving the unique identifier number to your particular survey, which will take you directly to step 48. This allows the client to change any of the questions or to add additional questions to further focus on a particular issue. In final step 50, the web site survey creation portion of the survey creation system 10, is to provide the client with a unique identifyer number or a unique client survey telephone number that identifies this particular survey. This will allow the client to access the survey questions to modify them in the future and to allow the client to complete the remaining portion of the survey.

Figure 3:
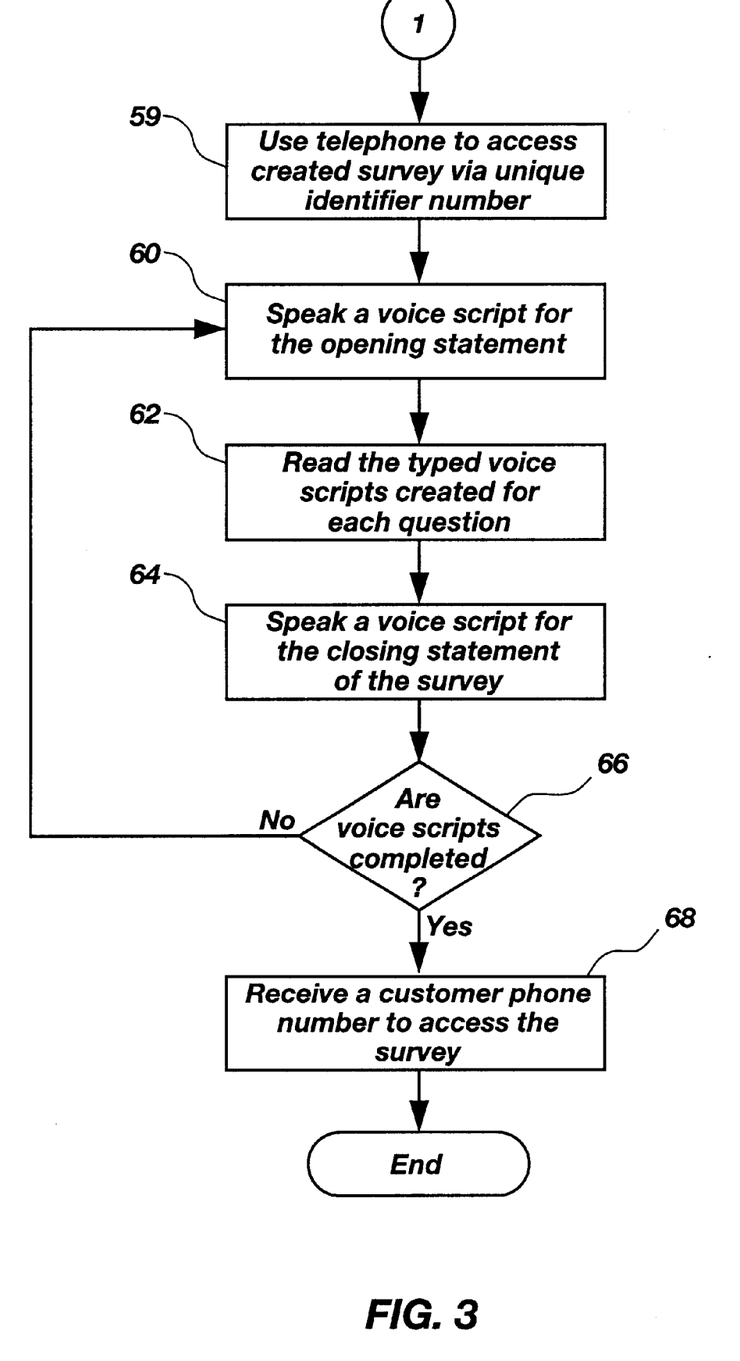
FIG. 3 is a detailed schematic flow chart of a second portion of FIG. 2.

Referring to FIG. 3, there is a detailed schematic flow chart of a second portion of creating the survey as illustrated in FIG. 1. Up to now, the typed in questions have been essentially used as place holders in the database. A computer could process (or speak) the typed text through speech synthesis, but it would sound stilted and computerized. It is also noted that the client could also print out questions for reading later. Now, according to FIG. 3, once the initial survey is set up, the client uses the telephone, in step 59, to access the survey creation system and provide the unique identifyer number to access the particular survey previously created over the web site. The system will prompt the client, in step 60, to speak a greeting for the opening statement, if one were programmed into the survey. The client then completes the greeting program sequence, which typically is to listen to the recording and to either re-record the greeting or to indicate that the recording is completed. In the next sequence of steps 62, the client is prompted to read the questions that were previously typed onto the web site when creating the sequenced programmed survey questions. When all of the voice scripts for each question have been recorded to the satisfaction of the client, the next step, step 64, is to record an ending script for the closing statement, if one were previously programed for the survey. As with all of the previous steps, in step 66, the client is also given the chance to listen to the recordings and to modify any particular voice script. Thus, the client can listen to the entire survey. If any portions of the voice script in the survey need to be changed, the client can return to step 60 and go through all of the voice scripts again. When the recordings are acceptable to the client, then in final step 68, the client is provided with a unique customer phone number, which is different from any previously provided number, that the client will provide only to customers who are to take the survey over the phone. The customer number will only allow the customer to take the particular survey associated with that number, and will not access any other part of the survey system, like allowing the customer to make any changes or take other surveys. It is noted that the assigning of the customer number can take place at any time during the survey creation process other than the one illustrated herein.

Figure 4:
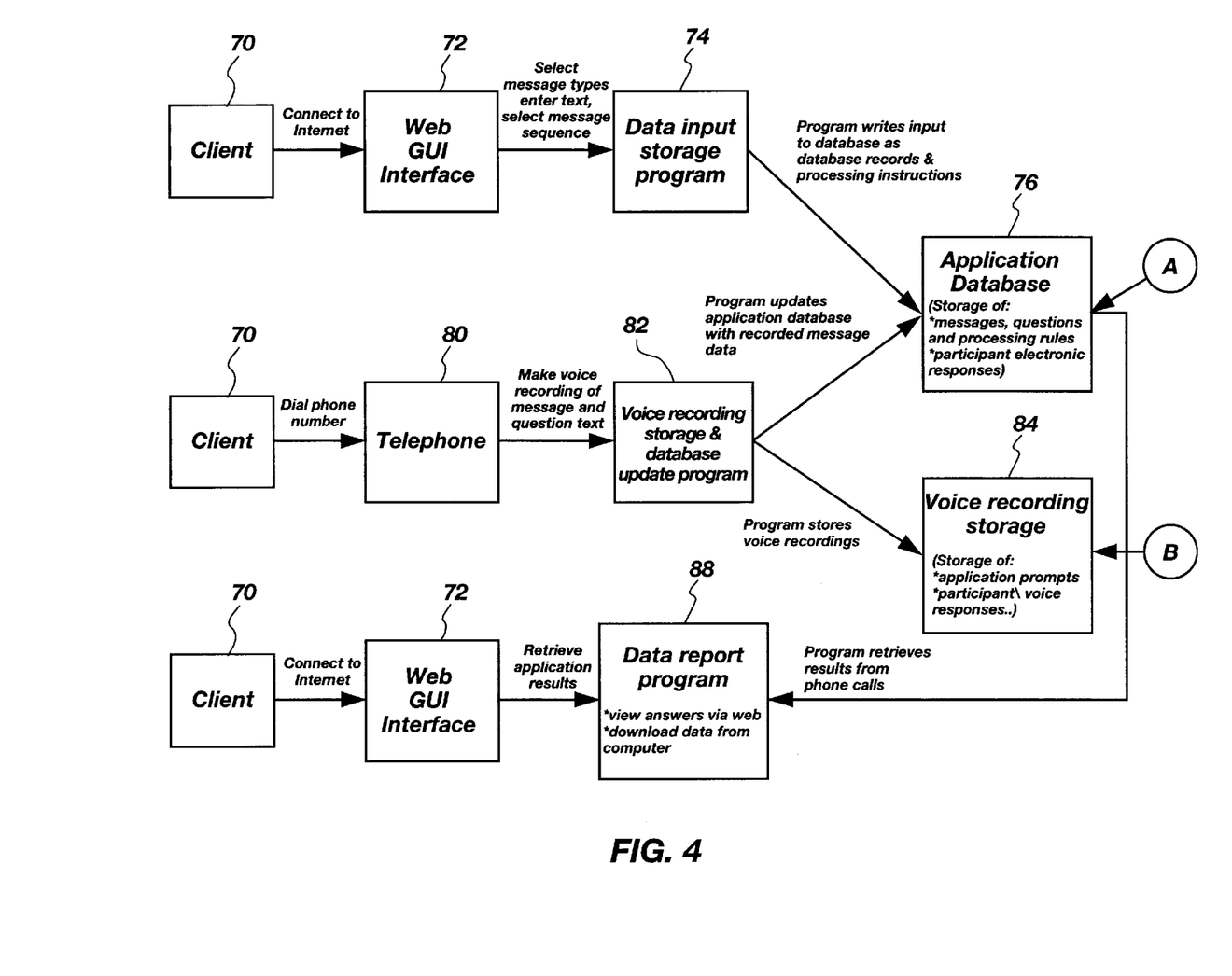
FIG. 4 is a detailed schematic of the application set-up, database usage and storage processes.

Referring to FIG. 4, there is a schematic of the application set-up, database use and storage processes. In particular, client 70 connects to the Internet to access the web site that presents the GUI (graphical user interface) 72. Once viewing the GUI the client selects which of the pre-defined entries to use to create his unique survey. The data input storage program 74, will take the entries and create a database record for each entry and store them in an application database 76. Database program 74, thereby creates a script or a set of processing instructions, for tying together the database records 76 in the selected order that the client selected for the enteries, including branching of question sequences so that, for example, males are not answering female related questions and vis a versa.

It is noted, the broad meaning of the word "entries or entry" includes any part of the survey that is created by the client or being entered into the survey. For example, entries that provide for creating an opening or closing messages can be selected by the client in which the client can make statements. Additionally, it is anticipated that largest number of entries will be in the form of questions, like multiple choice or true and false. However, other questions could be open-ended questions that require the survey customer to speak a short response, like why did you vote for your candidate, or why did you by that product. Other typical entries could be a social security number, employee number, age, political party affiliation, number of times voting, or any imaginable question that can be entered using a key pad on a phone. There are other features that are also defined as entries, such as selecting the order of the previous entries. All of these examples and others, which are not presented, are referred to as entries or message types.

In the second phase of the survey creation, client 70 uses the unique client telephone number to access the particular survey. The survey program will prompt the client over the telephone 80 to make voice recordings, or to read the typed scripts created over the web site, to match the messages and questions created. A voice recording storage and database update program 82 will store or load updates for the survey application database 76 and store the voice recordings in a voice recording storage medium 84.

To access the collected survey results, client 70 again connects to web site 72. However, the client retrieves the application results using data report program 88, which downloads data from the application database 76. The data can be displayed in any known tabular or graph forms, like pie charts or bar graphs. Additionally, data can be down loaded over a standard web interface to the client's computer.

Figure 5:
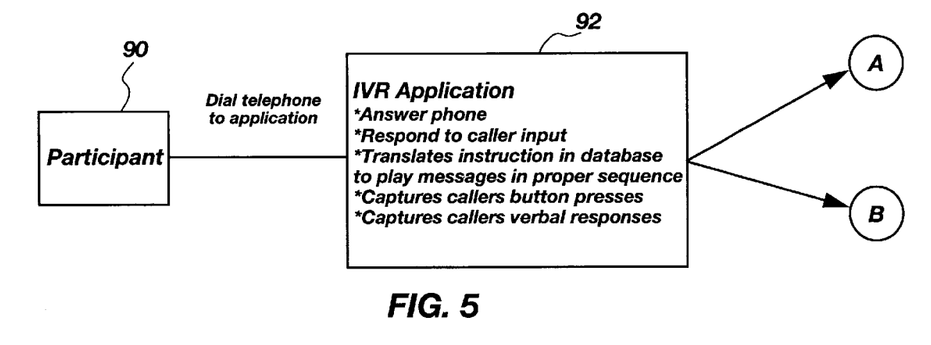
FIG. 5 is a schematic flow chart showing processing of participant activity.

Referring to FIG. 5, there is a continuation of the application summary flow chart for the participant or customer. In particular, participant 90, also referred to as a customer, dials the customer phone number for the application. An IVR application 92 (interactive voice response) will answer the phone. The IVR will then access application database 76, which in turn will access voice recording storage 84. The IVR can then respond to the caller inputs, translate instructions in the database 76 to play messages in proper sequence, capture callers telephone key pad button pressing responses in application database 76, and capture the caller's verbal responses in voice recording storage 84.

Figure 6:
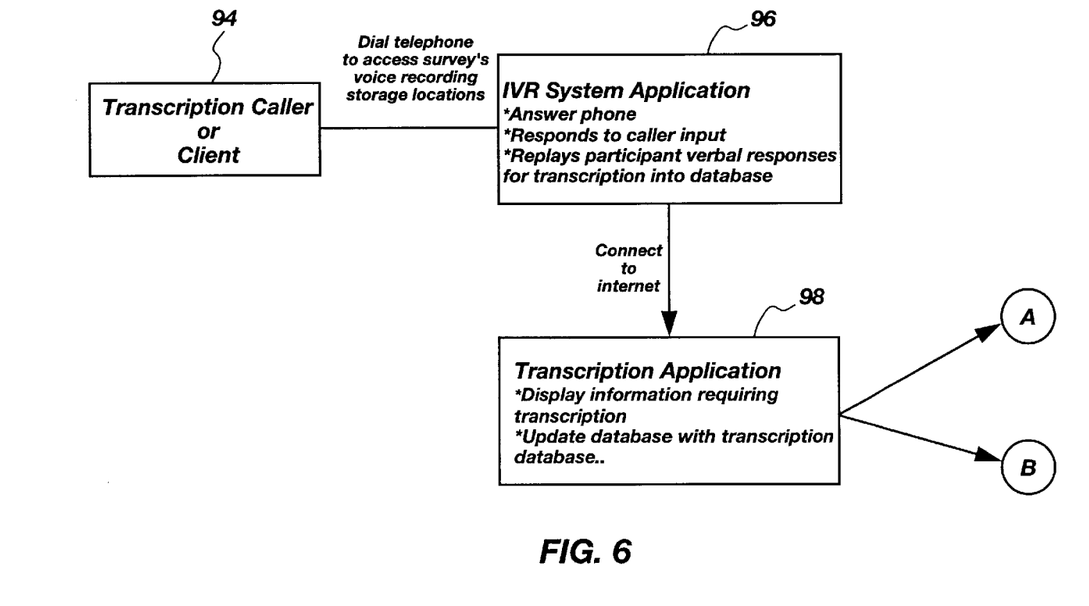
FIG. 6 is a schematic flow chart disclosing transcription activity as part of the present invention.

Referring to FIG. 6, there is a flow chart of another feature of the invention, in particular, there is a method of transcribing the verbal responses from customers of the survey. Specifically, the person who is going to do the transcribing 94 accesses the survey's voice recording storage 84 through a telephone. An IVR system answers the phone, responds to the callers input (entering a particular survey identification number), and will replay the verbal responses for the transcriber. The transcriber is provided with the opportunity to simultaneously log onto the web site 72 where he can access a transcription application. After the transcriber identifies which survey is to be accessed, the program displays which questions are able to be transcribed. Of course, the questions to be transcribed are the particular questions that have voice responses recorded from the survey customers. Additionally, the web site transcription application allows the transcriber to type in the voice responses that will then be entered into the application database 76. In other words, the voice recordings, which were stored in voice recording storage 84, are entered into the application database so the client can get a complete print-out of all responses without having to listen to each response. There is also the added feature of allowing the transcriber the option of removing or deleting the voice messages from the voice recording storage.

Remarks About the Preferred Embodiment

One of ordinary skill in the art of creating automated telephone surveys will realize many advantages from the present preferred embodiment. Specifically, the client will be able to design their own surveys and have it completed and ready to be used in less than half the time it took using previous prior art methods of using computer programmers.

A skilled artisan would also realize the advantage of having a human voice script read to the survey participants instead of having a computerized voice read the survey questions. In particular, the recorded human voice sounds more pleasing to the customers.

A second advantage from using the present preferred embodiment is the client's ability to easily change the survey questions at any time. Uniquely, the survey entries and questions can be changed immediately after being created, or even after the survey has been used by survey customers. Even more advantageous is the fact that the client can have the changes made in a matter of minutes and then potentially be used by the next survey customer.

A skilled artisan would consider it an obvious design change to make modifications to the particular flow of steps described in the creation of the survey. In particular, there may be no further criteria to be completed in steps 38, 40, and 44 in FIG. 2 after those entries have been selected. Additionally, the particular location of step 48, which allows modification of entries, can be done at most any time during the survey creation process. The only steps that are located in essential locations are steps 30, 50, 59, 68.

Another modification that would be obvious to skilled artisans involves the selection of the sequencing of the survey enteries, as discussed in relation to FIG. 4. In particular, it is well known to select a branching type of order. For example, if a survey customer answers "female" to a question, the customer can be routed or sequenced to questions that particularly are of interest to females and not males.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States patent is:

1. A method of allowing a client to create a survey for customers to take over a telephone, comprising the steps of:
    a) accessing a web site and creating a first portion of the survey by selecting entries and receiving a unique client survey telephone number; and
    b) establishing a telephone connection, using the unique client survey telephone number, for completing a second portion of the survey by providing a voice script for each of the entries selected in step a).

2. The method of claim 1, wherein the survey includes the step of allowing the client to modify the entries on the web site after the selection of each entry.

3. The method of claim 1, wherein the step of accessing a web site further comprises the steps of:
    a) selecting an entry from a pre-set entry list for the survey;
    b) determining if the selected entry is a question, and if so, prompting the client to type a voice script of the question to be asked in the survey, and thereafter completing the question criteria; and
    c) returning to the step of selecting a pre-set entry.

4. The method of claim 3, wherein the step of accessing a web site further comprises the steps of:
    a) selecting an entry from a pre-set entry list for the survey;

b) determining if the selected entry is an opening statement and, if so, prompting the client to complete opening statement entry criteria; and c) returning to the step of selecting a pre-set entry.

5. The method of claim 4, wherein the step of accessing a web site further comprises the steps of:

a) selecting an entry from a pre-set entry list for the survey;

b) determining if the selected entry is a closing statement, and if so, prompting the client to complete closing statement criteria; and c) returning to the step of selecting a pre-set entry.

6. The method of claim 5, wherein the step of accessing a web site further comprises the steps of determining if the entries are acceptable to the client, and if not, returning the client to the step of selecting a pre-set entry or previously created entry, and if acceptable, providing the client with the unique client survey telephone number.

7. The method of claim 6, wherein the step of establishing a telephone connection using the unique client survey telephone number, for completing a second portion of the survey by providing a voice script for each of the entries selected in step a), further comprises the steps of:

a) entering the unique client survey telephone number over the telephone to access the survey; and b) speaking a message for the opening statement, if there was an opening statement created over the web site.

8. The method of claim 7, wherein the step of establishing a telephone connection further comprises the steps of:

a) reading the voice scripts, over the telephone, that were created for each question typed onto the web site; and b) speaking a message for the closing statement, if there was a closing statement created over the web site.

9. The method of claim 8, wherein the step of establishing a telephone connection further comprises the steps of:

a) determining if the voice scripts are completed to the satisfaction of the client; and b) providing the client with a unique customer telephone number to be accessed by the customer to take the survey over the telephone.

10. The method of claim 9, further including the step of allowing the client to modify the entries created on the web site at any time after the survey is completed.

11. The method of claim 1, further comprising the steps of providing a survey customer telephone number to the client and recording customers' responses to questions included in the survey.

12. The method of claim 11, further comprising the steps of:

a) accessing collected survey responses, by allowing the client to connect to the web site and retrieve application results using a data report program, which downloads data from an application database; and b) displaying, in any known display form, the application responses.

13. The method of claim 12, further comprising the steps of:

a) allowing a customer to dial a customer-telephone number that accesses the survey;

b) running an interactive voice response system to access the survey via an application database and voice recording storage;

c) capturing the customer's telephone key pad button pressing responses in the application database; and d) capturing the customer's verbal responses in the voice recording storage.

14. The method of claim 13, further comprising the steps of:

a) allowing a transcriber to access the verbal responses from the customers, through a telephone, by connecting the transcriber to the survey's voice recording storage;

b) replaying the customer's verbal responses over the telephone; and c) allowing the transcriber to access the web site and allowing the transcriber to type in the verbal responses onto the web site to update the application database.

* * * * *